United States Patent
Coon

(10) Patent No.: US 7,325,852 B1
(45) Date of Patent: Feb. 5, 2008

(54) CLUSTER MOUNTING BRACKET

(75) Inventor: Zachary A Coon, Walled Lake, MI (US)

(73) Assignee: Yazaki North America, Inc., Canton, MI (US)

( * ) Notice: Subject to any disclaimer, the term of this patent is extended or adjusted under 35 U.S.C. 154(b) by 204 days.

(21) Appl. No.: 11/340,204

(22) Filed: Jan. 26, 2006

(51) Int. Cl.
B62D 25/14 (2006.01)

(52) U.S. Cl. .............................. 296/72; 296/70; 180/90

(58) Field of Classification Search ............... 296/70, 296/72; 180/90; 248/200, 201, 205.1, 213.2, 248/674, 675, 475.1, 37.6, 534, 48.2
See application file for complete search history.

(56) References Cited

U.S. PATENT DOCUMENTS

| | | |
|---|---|---|
| 2,991,398 A | 7/1961 | Strong |
| 5,062,604 A | 11/1991 | Monnier |
| 5,148,353 A | 9/1992 | Morgan et al. |
| 5,219,135 A | 6/1993 | Scott |
| 5,430,612 A | 7/1995 | Simon et al. |
| 5,621,618 A | 4/1997 | Komiyama |
| 5,672,823 A | 9/1997 | Lachmann et al. |
| 5,873,749 A | 2/1999 | Takiguchi et al. |
| 6,222,736 B1 | 4/2001 | Sim et al. |
| 6,227,500 B1 | 5/2001 | Inaba et al. |
| 6,389,896 B1 | 5/2002 | Tomita et al. |
| 6,864,573 B2 | 3/2005 | Robertson et al. |

*Primary Examiner*—Lori L. Lyjak
(74) *Attorney, Agent, or Firm*—Harness, Dickey & Pierce, P.L.C.

(57) ABSTRACT

A vehicle instrument panel can include a housing and a bracket that is coupled to the housing. The housing has an aperture and a structure with a projecting portion coupled to an attachment portion. The bracket can include a first arm, a second arm and a leg that is disposed between the first arm and second arm. The first arm of the at least one bracket can be received in a first side of the attachment portion and the second arm can be received in a second side of the attachment portion.

18 Claims, 5 Drawing Sheets

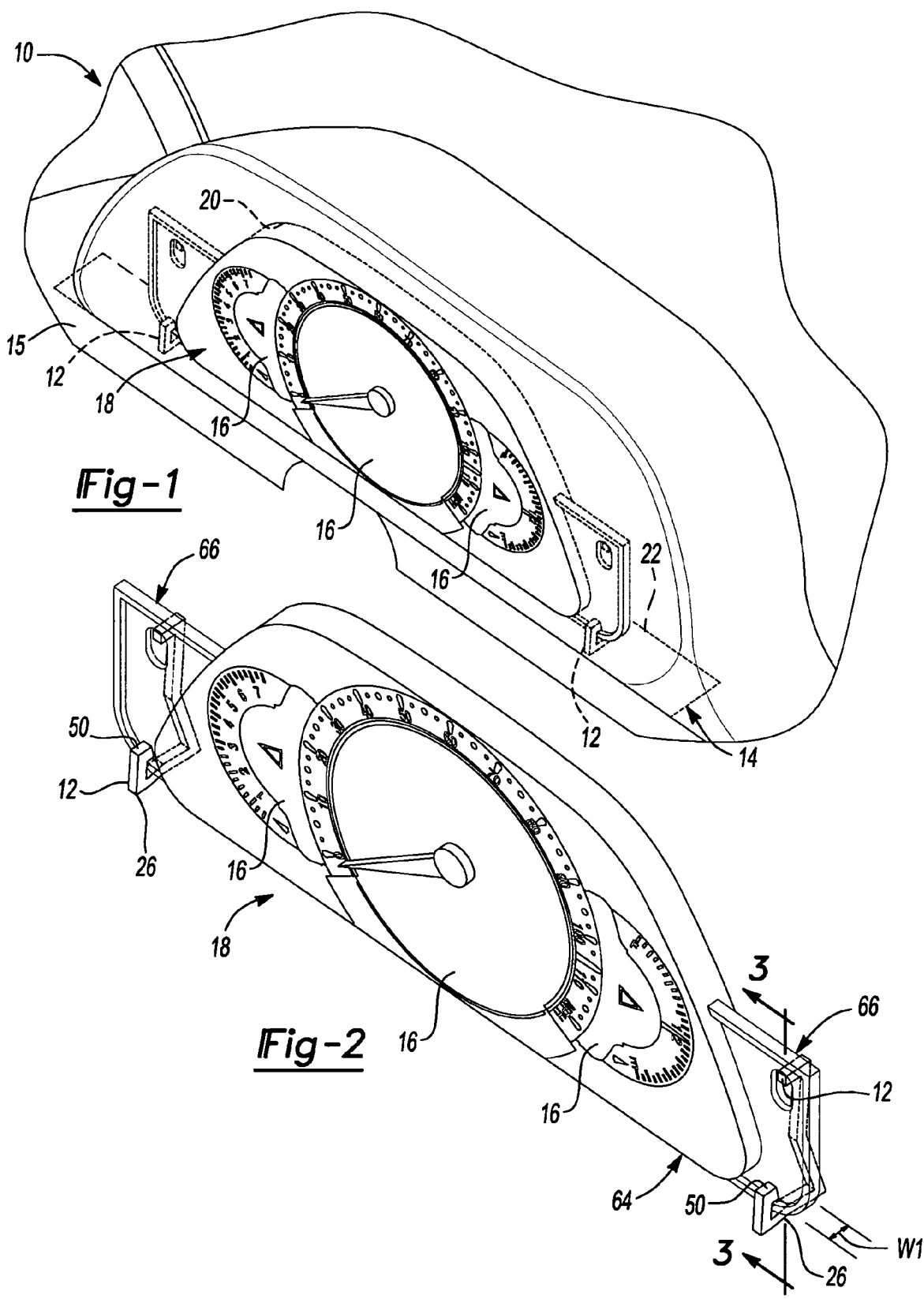

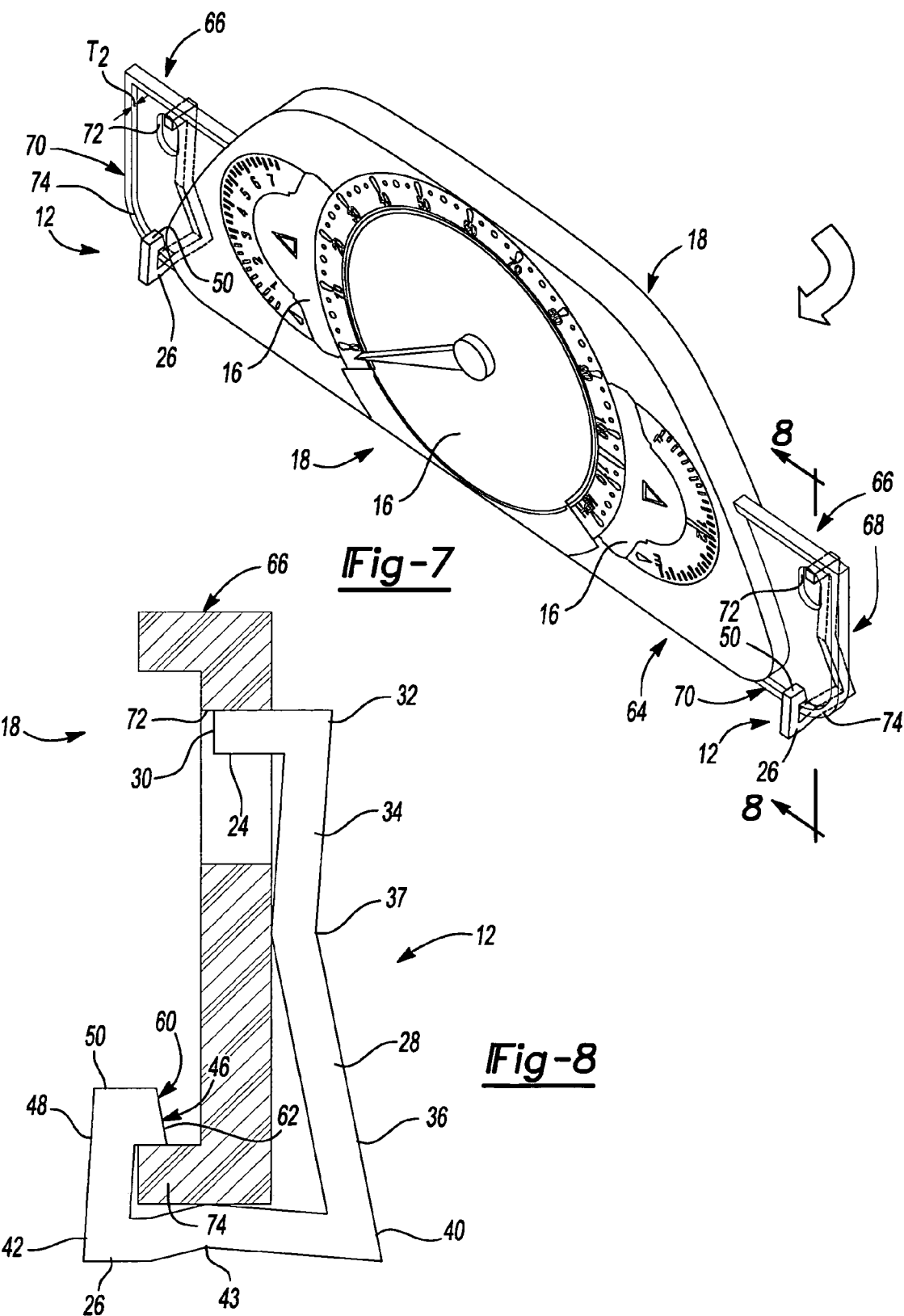

CLUSTER MOUNTING BRACKET

FIELD

The present disclosure relates to mounting structures, and more particularly to a cluster mounting bracket.

BACKGROUND

The statements in this section merely provide background information related to the present disclosure and may not constitute prior art.

Various mounting bracket systems exist for coupling various components, such as instrument gage clusters to an instrument panel. Typically, these systems require the use of screws to secure the instrument cluster to the mounting bracket. The use of screws can increase assembly time and can also lead to increased part cost. Accordingly, it may be desirable to provide an integral mounting bracket for an instrument gage cluster that reduces the amount of screws.

SUMMARY

The present teachings disclose a vehicle instrument panel. The vehicle instrument panel can include a housing and a structure. The structure can include an attachment portion coupled to a projecting portion. The vehicle instrument panel can also include at least one bracket coupled to the housing. The at least one bracket can include a first arm, a second arm and a leg that is disposed between the first arm and second arm. The first arm of at least one bracket can be received in a first side of the attachment portion and the second arm can be received in a second side of the attachment portion.

The present teachings can also provide a method. The method can include providing a mounting bracket having a first arm, a second arm and a leg that is disposed between the first arm and second arm, with the leg including a first portion coupled to the first arm and a second portion coupled to the second arm. The method can also include providing a structure defining an aperture and including a first side and a second side defining a lip. The method can include inserting the structure into a channel formed by the first arm, the leg and the second arm. The method can further include rotating the second housing so that the first arm engages the aperture, the leg abuts the first surface, and the second arm engages the lip on the second side of the mounting bracket to thereby couple the mounting bracket to the structure. The method can also include coupling the mounting bracket to a housing Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 1 is an environmental view of a cluster mounting bracket according to various teachings;

FIG. 2 is a detailed environmental view of the cluster mounting bracket of FIG. 1;

FIG. 7 is a perspective view of a second procedure employed to assemble an exemplary instrument gage cluster to the cluster mounting bracket; and FIG. 8 is a cross-sectional view of the second procedure employed in FIG. 7, taken along line 8-8 of FIG. 7.

DETAILED DESCRIPTION

Figure 3:
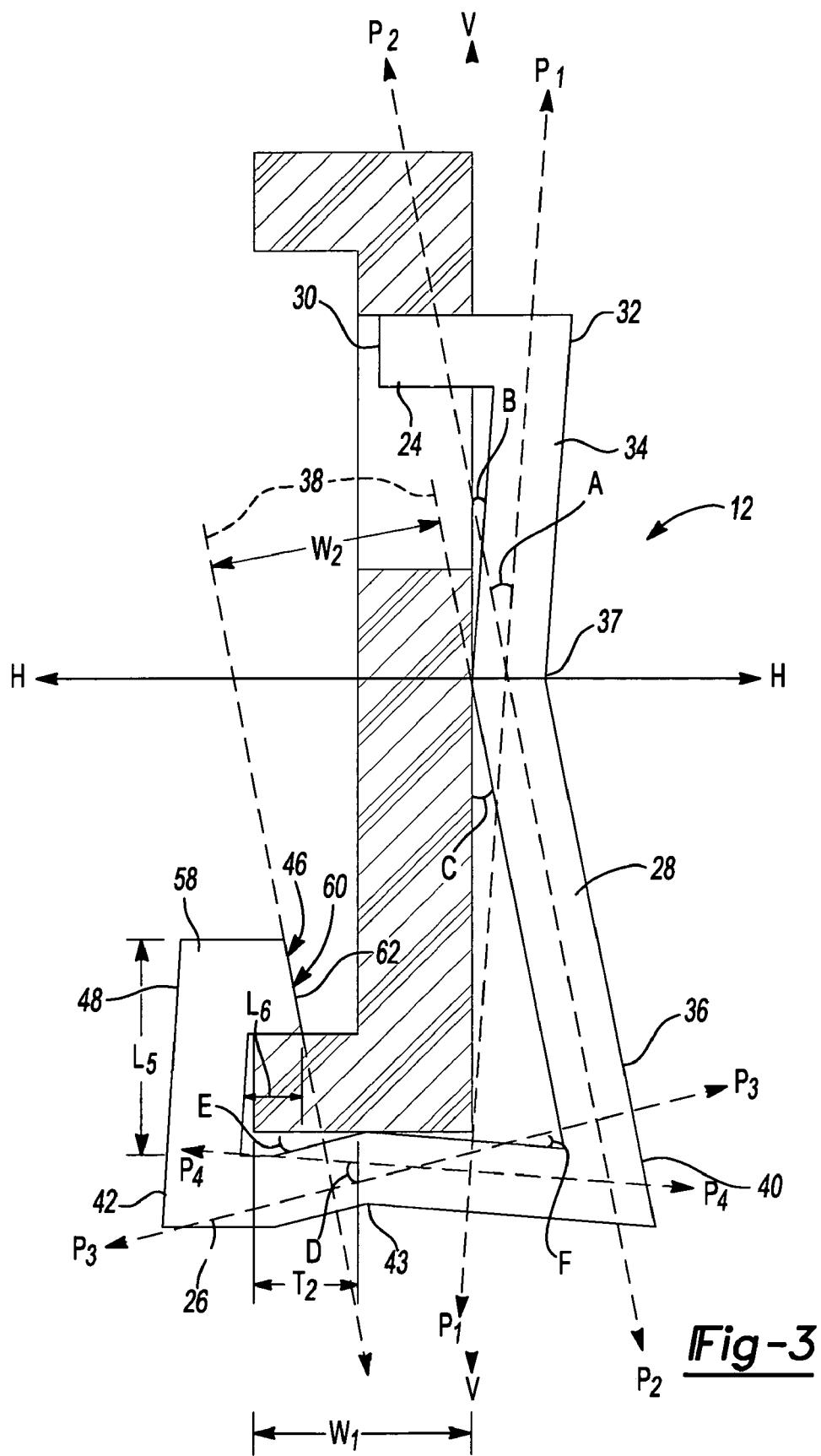
FIG. 3 is a cross-sectional view of the cluster mounting bracket of FIG. 2, taken along line 3-3 of FIG. 2.

The following description is merely exemplary in nature and is not intended to limit the present disclosure, application, or uses.

With reference to FIGS. 1 and 2, a portion of an exemplary motor vehicle 10 with a cluster mounting bracket 12 is shown. The motor vehicle 10 can include an instrument panel 14 disposed in a passenger area 15. The instrument panel 14 can include one or more gages 16 that can be assembled as one unit or instrument cluster 18. It will be understood, however, that although the description herein will refer to the mounting bracket 12 for use with an instrument cluster 18, the mounting bracket 12 as disclosed herein could be used with a single gage 16. The instrument panel 14 can include a throughbore 20 for receipt of at least a portion of the instrument cluster 18. The instrument panel 14 can further include a support 22 adapted to enable the mounting bracket 12 to be coupled to the instrument panel 14. The mounting bracket 12 can be integrally formed with the support 22, or the mounting bracket 12 could be a discrete component separate from both the instrument panel 14 and the instrument cluster 18. If the mounting bracket 12 is discrete from the instrument panel 14 and instrument cluster 18, then the mounting bracket 12 could be coupled to the support 22 via mechanical fasteners and/or adhesives, as will be described in greater detail herein.

Figure 4:
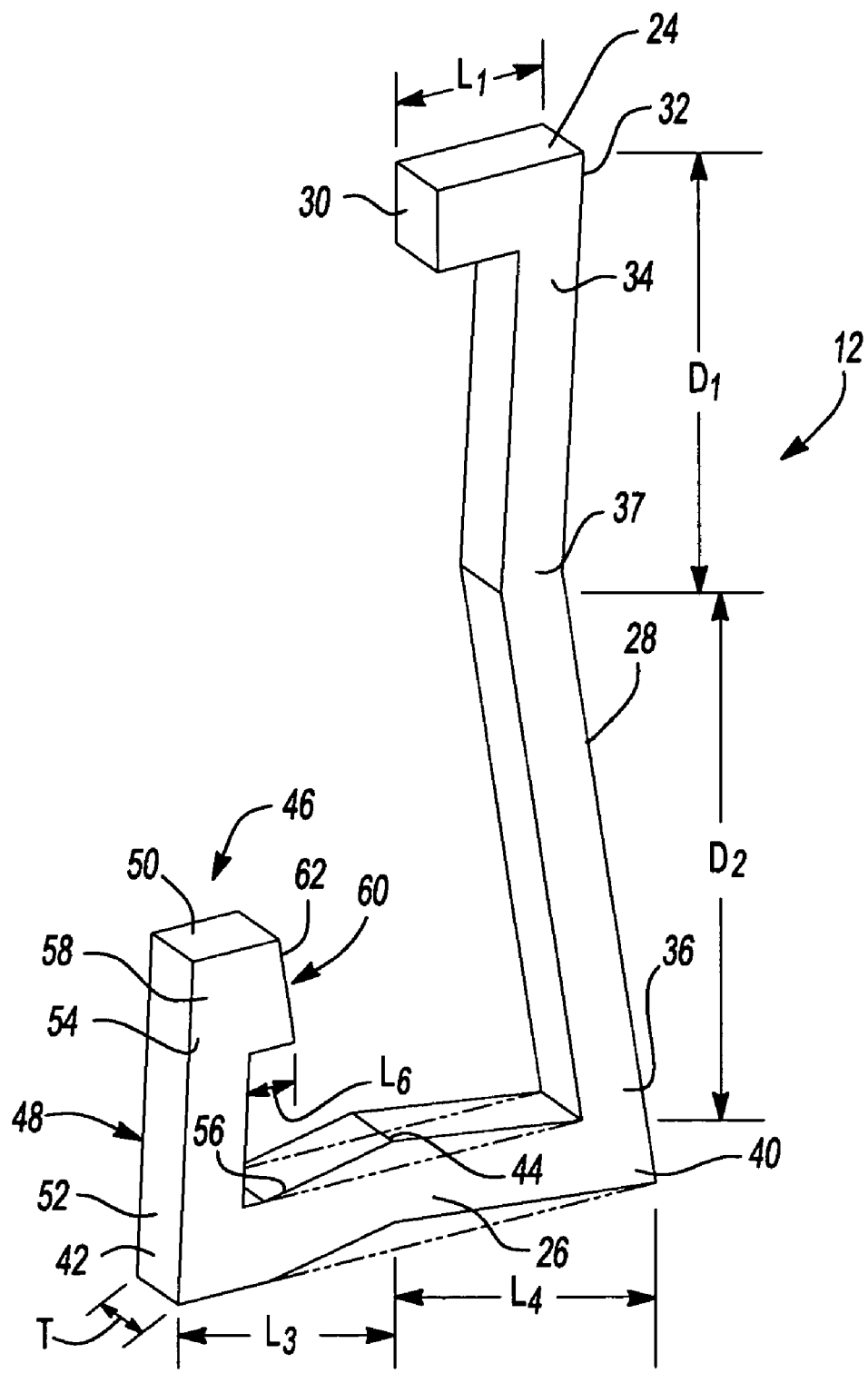
FIG. 4 is a perspective view of the cluster mounting bracket of FIG. 1.

In FIGS. 3 and 4, the mounting bracket 12 can include a first arm 24, a second arm 26 and a leg 28 disposed between the first arm 24 and the second arm 26. The mounting bracket 12 can be composed of a metallic or polymeric material, such as a rigid polymeric material including acrylonitrile butadiene styrene (ABS), polypropylene, polycarbonate-ABS, nylon, and acetal, or a metallic material such as aluminum, steel and magnesium, for example. The mounting bracket 12 can have a uniform thickness T, or could be configured such that the first arm 24, second arm 26 and/or leg 28 have a desired thickness based upon the configuration of the instrument panel 14 and instrument cluster 18 (FIG. 4). The first arm 24 can have a length L1, which can be configured to enable the first arm 24 to selectively engage the instrument cluster 18 (FIG. 4). The first arm 24 can also include a first end 30 and a second end 32. The first arm 24 may be slightly offset from a horizontal axis H, or could be parallel to the horizontal axis H. The first end 30 can be configured to selectively engage the instrument cluster 18, and the second end 32 can be coupled to the leg 28.

The leg 28 can include a first end 34 and a second end 36 separated by a transition portion 37. The transition portion 37 can denote a portion of the leg 28, wherein a longitudinal axis P1 of the first end 34 intersects a longitudinal axis P2 of the second end 36 at an angle A (FIG. 3) that can range between about 10° to about 40°.

The first end 34 of the leg 28 can be coupled to the second end 32 of the first arm 24 and can be disposed an angle B with respect to a vertical axis V. The angle B can generally range between 0° and 10°, depending upon the configuration of the instrument cluster 18. The first end 34 can extend for a distance D1 to support the instrument cluster 18, and to prevent the movement of the instrument cluster 18 when the instrument cluster 18 is coupled to the mounting bracket 12, as will be discussed in greater detail herein.

The second end 36 of the leg 28 can be disposed an angle C with respect to the vertical axis V to provide a channel 38 (as shown in phantom) between the leg 28 and second arm 26. The angle C can generally range between 10° and 40°, based upon a width W1 of the instrument cluster 18, as will be described in greater detail herein. Generally, the angle C is such that the channel 38 has a width W2, which is slightly larger than the width of W1 of at least a portion of the instrument cluster 18. The second end 36 can extend for a distance D2 as necessary to receive a desired portion of the instrument cluster 18 to enable the instrument cluster 18 to be coupled to the mounting bracket 12 (FIG. 4). The second end 36 can be coupled to the second arm 26.

The second arm 26 can include a first end 40 coupled to the second end 36 of the leg 28 and a second end 42. The second arm 26 can be coupled to the leg 28. The first end 40 can be separated from the second end 42 by a transition portion 44. The transition portion 44 can denote a portion of the second arm 26, wherein a longitudinal axis P3 of the first end 40 intersects a longitudinal axis P4 of the second end 42 at an angle D that can range between about 0° to about 40°. Typically, the mounting bracket 12 can be coupled to the support 22 of the instrument panel 14 via the second arm 26, thus the shape of the second arm 26 can be designed as necessary to mate with the support 22 and can define an aperture (not shown) for receipt of a fastener (not shown) to couple the mounting bracket 12 to the support 22.

The first end 40 of the second arm 26 can generally be coupled to the second end 36 of the leg 28. The first end 40 of the second arm 26 can be offset an angle F with respect to the horizontal axis H. The angle F can generally range between 0° and 40°. The first end 40 can have a length L4, which can be generally equivalent to the width of the channel 38, as the first end 40 of the second arm 26 and the second end 36 of the leg 28 can define the channel 38 (FIG. 4).

The second end 42 of the second arm 26 can be coupled to the transition portion 44 of the second arm 26 and can be offset an angle E with respect to the horizontal axis H as desired to couple the second arm 26 to the support 22 of the instrument panel 14 (FIG. 3). The angle E can generally range between 0° and 40°. The second end 42 can have a length L3 as desired to receive a portion of the instrument cluster 18 to enable the instrument cluster 18 to be coupled to the mounting bracket 12. The second end 42 can include an engagement projection 46 (FIG. 4).

The engagement projection 46 can include a stem 48 and a projection 50 coupled to the stem 48. The stem 48 can have a first end 52 and a second end 54 (FIG. 4). The first end 52 can be coupled to the second end 42 of the second arm 26 and can have a length L5. The length L5 can be such that the projection 50 can engage the instrument cluster 18 to lock the instrument cluster 18 to the mounting bracket 12. The projection 50 can have a first end 58 and a second end 60. The first end 58 of the projection 50 can be coupled to the second end 54 of the stem 48. Typically, the projection 50 can be parallel to the horizontal axis H. The projection 50 can have a length L6, which can be such that the second end 60 of the projection 50 can engage the instrument cluster 18. The second end 60 of the projection 50 can generally include an angular surface 62. Although the surface 62 is shown as angular, the surface 62 could have any desired shape as necessary to mate with the instrument cluster 18.

Figure 5:
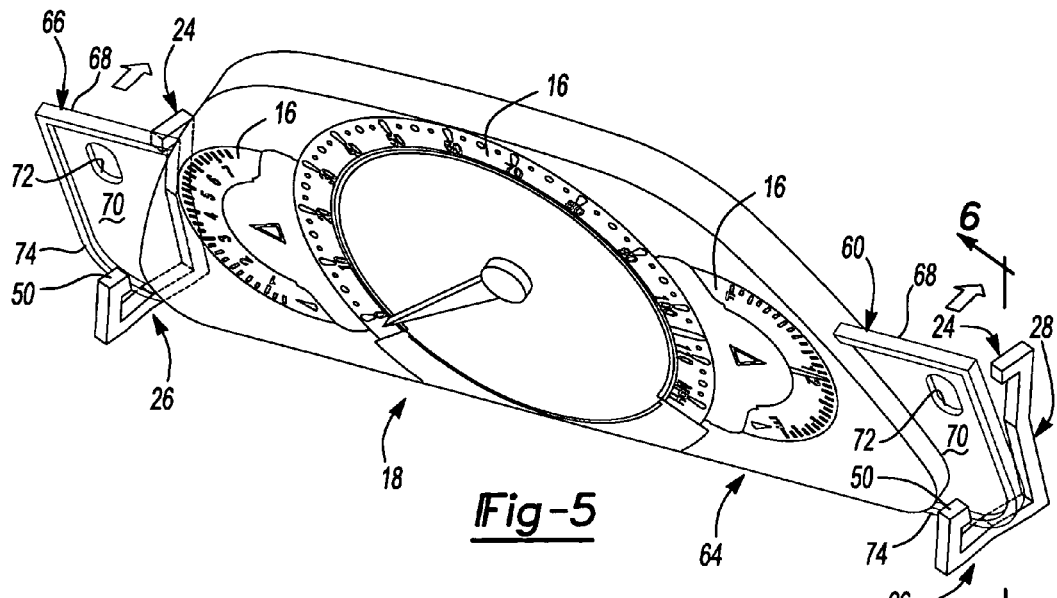
FIG. 5 is a perspective view of a first procedure employed to assemble an exemplary instrument gage cluster to the cluster mounting bracket.
Figure 6:
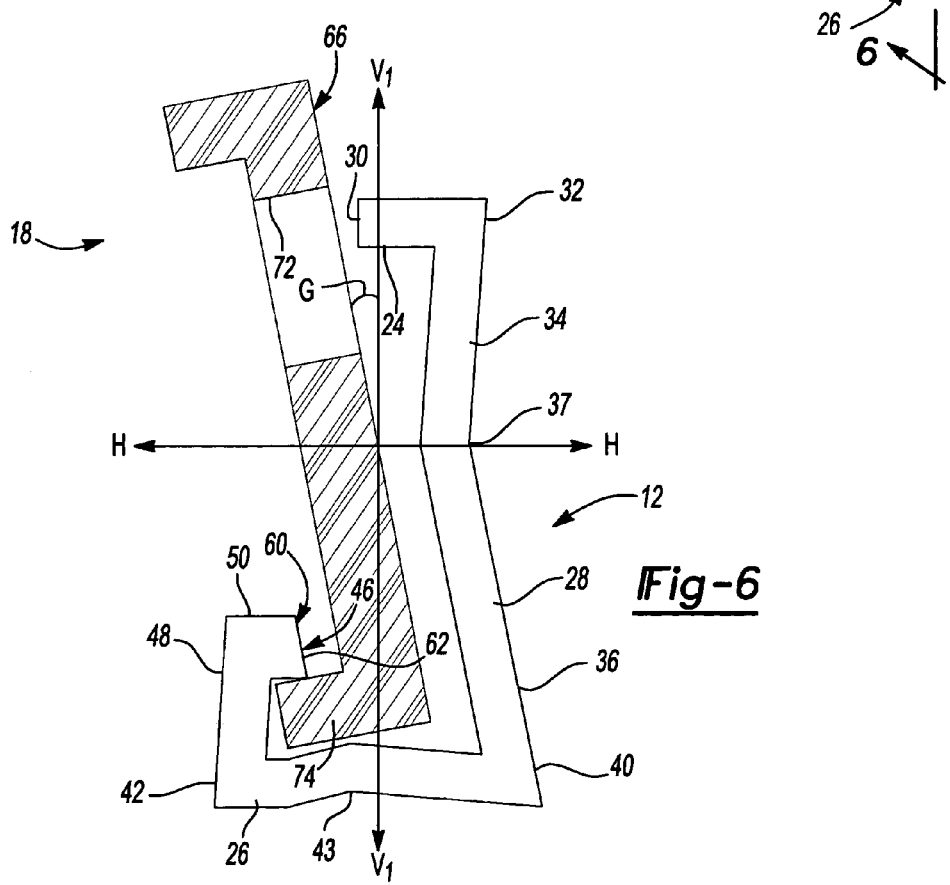
FIG. 6 is a cross-sectional view of the first procedure employed in FIG. 5, taken along line 6-6 of FIG. 5.

With reference to FIGS. 1, 5 and 6, the instrument cluster 18 can include projecting portion 64 and an attachment portion 66. The projecting portion 64 can include the gage(s) 16 and can generally extend through the throughbore 20 defined in the instrument panel 14 into the passenger area 15 so that an occupant (not shown) in the passenger area 15 can use the gage(s) 16. The attachment portion 66 can include a first side 68 and a second side 70. It will be understood that although the drawings depict the instrument cluster 18 as including two attachment portions 66, the instrument cluster 18 could alternatively include only one attachment portion 66.

The first side 68 of the instrument cluster 18 can generally define an aperture 72, which may extend fully or partly through the attachment portion 66. The aperture 72 can be configured so that the first end 30 of the first arm 24 can be retained in the aperture 72 to couple the instrument cluster 18 to the mounting bracket 12. The second side 70 can include a groove or lip 74, which can have a thickness T2 (FIG. 3) to assist in coupling the instrument cluster 18 to the mounting bracket 12. The thickness T2 can generally be sized so that the engagement of the lip 74 of the instrument cluster 18 and the projection 50 can lock the instrument cluster 18 to the mounting bracket 12.

The mounting bracket 12 can be coupled to the support 22 on the instrument panel 14 and, therefore, at least a portion of the instrument cluster 18 can be inserted into the throughbore 20 of the instrument panel 14 with the attachment portion 66 aligned with the mounting bracket 12. The instrument cluster 18 can be coupled to the instrument panel 14 with the gage(s) 16 or the gage(s) 16 could be coupled to the instrument cluster 18 after the instrument cluster 18 is coupled to the mounting bracket 12. Generally, the instrument cluster 18 can be inserted at an angle G with respect to a vertical axis $V_1$, which is parallel to the mounting bracket 12 so that the attachment portion 66 can enter the mounting bracket 12 via the channel 38 (FIGS. 5 and 6). The attachment portion 66 can be inserted into the mounting bracket 12 through the channel 38 until the attachment portion 66 contacts the first end 40 of the second arm 26. At this point, the first side 68 and second side 70 of the attachment portion 66 are generally parallel to the second end 36 of the leg 28 and the surface 62 of the projection 50.

Once the attachment portion 66 contacts the first end 40 of the second arm 26, the instrument cluster 18 can be rotated away from the passenger area 15. The instrument cluster 18 can generally be rotated until the attachment portion 66 is approximately perpendicular to the horizontal axis H, as shown in FIGS. 7 and 8. When the instrument cluster 18 is rotated into being approximately perpendicular with the horizontal axis H, the first end 30 of the first arm 24 can enter or engage the aperture 72 formed in the attachment portion 66 to secure the instrument cluster 18 to the mounting bracket 12. Approximately simultaneously, the projection 50 of the engagement projection 46 of the second arm 26 can mate with the lip 74 of the second side 70 of the attachment portion 66 to lock the second side 70 of the attachment portion 66 to the mounting bracket 12. When the instrument cluster 18 is rotated so that the first arm 24 and second arm 26 are engaged with the first side 68 and second side 70 of the attachment portion 66, the instrument cluster 18 can be secured or locked to the mounting bracket 12.

When the instrument cluster 18 is secured to the mounting bracket 12, the first end 34 of the leg 28 can prevent the rearward movement of the attachment portion 66 with respect to the horizontal axis H and the projection 50 can prevent the vertical movement of the attachment portion 66 with respect to the vertical axis V (FIG. 3).

The description of these teachings is merely exemplary in nature and, thus, variations that do not depart from the gist of the teachings are intended to be within the scope of the teachings. Such variations are not to be regarded as a departure from the spirit and scope of the teachings.

What is claimed is:

1. A vehicle instrument panel comprising:
   a housing having an aperture;
   a structure having an attachment portion, the attachment portion being coupled to a projecting portion; and
   at least one bracket coupled to the housing, the at least one bracket having a first arm, a second arm and a leg that is disposed between the first arm and second arm, the first arm being received in a first side of the attachment portion and the second arm being received in a second side of the attachment portion.

2. The vehicle instrument panel of claim 1, wherein the at least one bracket is formed of a material selected from the group comprising: acrylonitrile butadiene styrene (ABS), polypropylene, polycarbonate-ABS, nylon, acetal, aluminum, steel, and magnesium.

3. The vehicle instrument panel of claim 1, wherein the at least one bracket is integrally formed with the housing.

4. The vehicle instrument panel of claim 1, wherein the at least one bracket is a discrete component independent of the housing and the structure.

5. The vehicle instrument panel of claim 1, wherein the leg further includes a transition portion between a first end and a second end of the leg so that the first end is approximately parallel to the first side of the attachment portion and the second end extends outwardly from the transition portion.

6. The vehicle instrument panel of claim 5, wherein the second end of the leg is angled from the transition portion for receipt of the attachment portion in a first position.

7. The vehicle instrument panel of claim 6, wherein the second arm further includes a first end coupled to the second end of the leg and a second end, with an engagement projection extending from the second end, the engagement projection defining a stem and a projection, the projection being selectively coupled to the second side of the attachment portion.

8. The vehicle instrument panel of claim 7, wherein the projection includes an angled surface approximately parallel to the second end of the leg.

9. The vehicle instrument panel of claim 7, wherein a distance between the angled surface of the projection and the second end of the leg forms a channel for receipt of the attachment portion at an angle.

10. The vehicle instrument panel of claim 7, wherein the first arm includes a first end coupled to the first end of the leg and a second end selectively coupled to the attachment portion, the first arm parallel to the projection of the second arm.

11. The vehicle instrument panel of claim 9, wherein the attachment portion further comprises:
    an aperture sized for receipt of the second end of the first arm; and
    a lip defined on the second side, the lip configured to engage the projection of the second arm to couple the attachment portion to the at least one bracket.

12. A vehicle instrument panel comprising:
    a mounting bracket having a leg, a first arm and a second arm, the first arm being coupled to the leg and extending in a first direction therefrom, the second arm having a first end and a second end defining an engagement projection, the engagement projection including a projection and a stem that spaces the projection apart from the first end, the projection extending from the stem in a second direction that is opposite the first direction, the first end being coupled to the leg at a point that is spaced apart in the second direction from a point at which the first arm is coupled to the leg; and
    a structure having a first side and a second side, the first side defining an aperture, the second side defining a lip, wherein the first arm is received in the aperture, the leg is disposed proximate the first side of the structure and the lip is disposed between the projection and the second end of the second arm.

13. The vehicle instrument panel of claim 12, wherein the leg includes a first portion and a second portion and wherein the first and second portions intersect at a knee that is spaced apart in the first direction from the point at which the first arm is coupled to the leg.

14. The vehicle instrument panel of claim 13, wherein the knee abuts the first side of the structure.

15. The vehicle instrument panel of claim 12, wherein the first end and second end of the second arm intersect at a knee that defines a fulcrum, which contacts a surface of the structure that is located opposite of a surface of the lip that is engaged by the projection.

16. A method comprising:
    providing a mounting bracket having a first arm, a second arm and a leg that is disposed between the first arm and second arm, the leg including a first portion coupled to the first arm and a second portion coupled to the second arm;
    providing a structure defining an aperture and having a first side and a second side defining a lip;
    inserting the structure into a channel formed by the first arm, the leg and the second arm;
    rotating the structure so that the first arm engages the aperture, the leg abuts the first side, and the second arm engages the lip on the second side of the structure to thereby couple the mounting bracket to the structure; and
    coupling the mounting bracket to a housing.

17. The method of claim 16, wherein inserting the second housing into the channel further comprises:
    positioning the structure in an inserting orientation that is approximately parallel to at least the second portion of the leg.

18. The method of claim 17, wherein positioning the structure further comprises:
    moving the structure from the inserting orientation to an installed orientation so that the structure is disposed approximately parallel to the first portion of the leg.

* * * * *